Aug. 2, 1932.  P. PASCALE  1,869,771
APPARATUS FOR SEPARATING LIQUIDS FROM SATURATED FLUIDS
Filed Aug. 28, 1926

Inventor
Pasquale Pascale
By
Attorney

Patented Aug. 2, 1932

1,869,771

UNITED STATES PATENT OFFICE

PASQUALE PASCALE, OF NEW YORK, N. Y., ASSIGNOR TO DRI-STEAM VALVE CORPORATION, A CORPORATION OF DELAWARE

APPARATUS FOR SEPARATING LIQUIDS FROM SATURATED FLUIDS

Application filed August 28, 1926. Serial No. 132,283.

This invention relates to an apparatus for separating the gasiform content and the liquid content of a saturated fluid.

The gasiform content and the liquid content may be derived from the same substance as steam from water, or may be derived from different substances as in separating water vapor from gas in a water gas, etc.

The object of the invention is to provide a device by which the gasiform content and liquid content of a saturated fluid may be quickly and efficiently separated.

The apparatus shown is designed for use in separating fluids which pass through the device under pressure. The invention especially is useful in connection with a steam valve, in which connection it is desired to separate the liquid content from the gasiform content of saturated steam, and thereby enable the water or liquid content to be returned to the boiler and the gasiform content substantially denuded of moisture, to pass to the engine or other point of work.

The invention is also well adapted for use in the manufacture of water gas, where it is desired to pass the gas to the main in a comparatively pure state, and substantially free from moisture and condensates, thus preventing the moisture and condensates from reaching the main, and ultimately the gas meters, where the effect upon the diaphragms of meters, of the dry type is deleterious.

A further object of the invention is to provide a separator through which the liquid-ladened fluid is passed under pressure and divided into attenuated streams, and caused to forcefully impinge against a perforated surface, through which the gasiform content of the substance passes, substantially denuded of moisture, the liquid or condensates being trapped and directed back to the source of the saturated fluid.

In the drawing illustrating the invention,

Figure 3 is a sectional view of a portion of a steam valve of the marine type, showing an application of the separator thereto, the section of the valve being taken upon a line at right angles to the direction in which Figure 1 is taken.

Figures 1, 2:
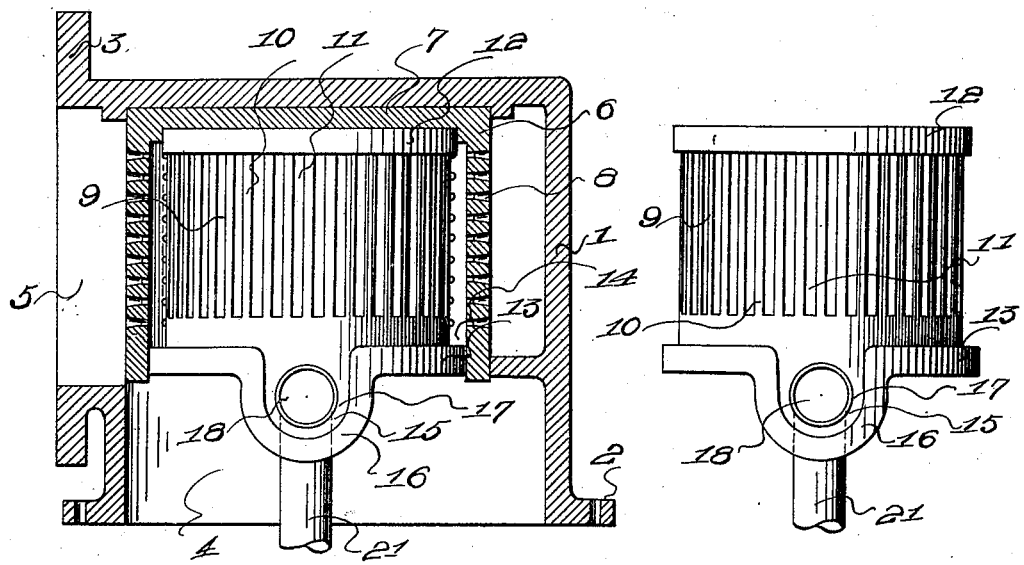
Figure 1 is a sectional view of the separator, or apparatus.
Figure 2 is an elevation of the cage and parts carried thereby removed from the separator.

From the following it will appear that the construction has another advantageous attribute in that the condensates or moisture to be separated from the fluid is trapped below the lower ends of the slots or openings between the vanes of the cage employed, thus eliminating the possibility of these condensates being picked up and carried on with the incoming stream of fluid, which it will be understood is constant when the separator is in operation.

Referring to the drawing:

The numeral 1 designates a casing provided at its bottom with an annular flange 2, by which it may be bolted to a boiler or other source of the fluid desired to be separated. The casing is provided with another flange 3, by which the casing 1 may be bolted to a pipe or main leading to an engine or other object to which it is desired to deliver substantially liquid free gasiform fluid.

The casing is provided with an inlet opening 4, and an outlet opening 5. Stationarily held within the casing is a cylinder 6, preferably closed at its top as indicated at 7. This cylinder is provided circumferentially with numerous outwardly flowing perforations or nozzles 8.

Figure 3:
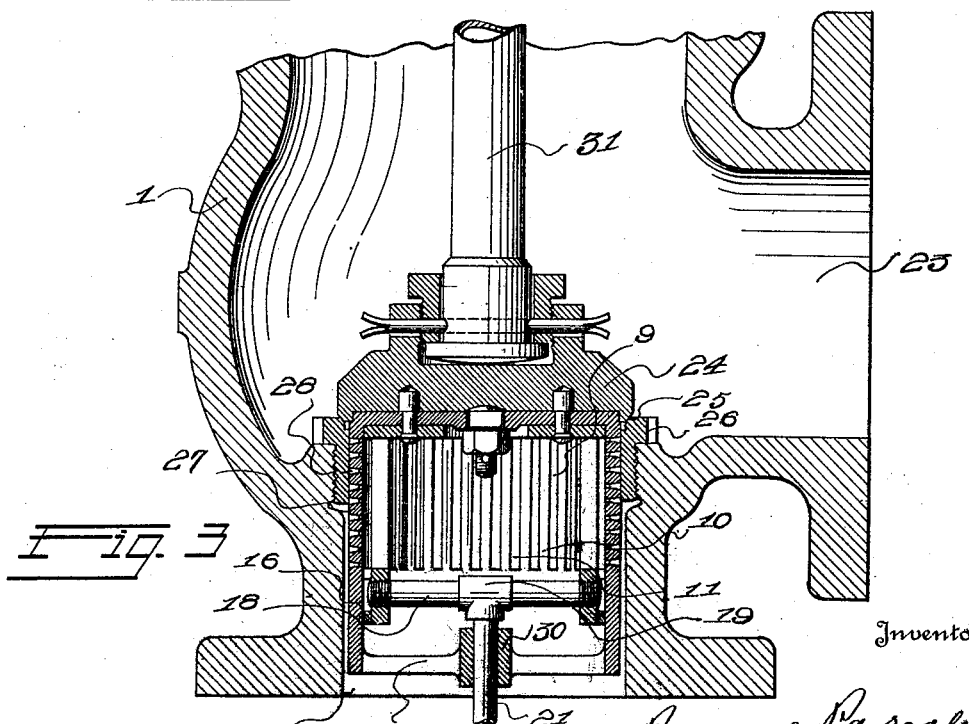

Stationarily positioned within the cylinder 6 is a cage 9, provided circumferentially and preferably throughout its entire circumference with vanes or slats 10, suitably spaced apart, thus providing numerous narrow slots 11. The cage is closed at its top by a cover 12, but its bottom is open so as to permit, say for instance steam, to pass through the slots and thereby be divided into numerous attenuated streams and be caused to forcefully impinge against the inner periphery of the cylinder. The cage below the slots is provided with a flange 13, extending virtually entirely around the cage with the exception of a portion presently mentioned. This flange extends beyond the periphery of the cage, with its outer edge fitting snugly against the inner wall of the cylinder, as shown, thus providing an annular channel 14. At opposite sides the cage body is dropped down below the flange 13, to form ears 15, each provided with a flange 16 which merges into the flange 13, as shown in Figures 1 and 3 thus forming a sump 17, on each side of the cage body. Threaded into the ears are short pipes 18, whose opposite ends enter a T-fitting 19, into whose vertical branch 20 is threaded a drain pipe 21.

In Figure 3 the separator is shown applied to a steam valve of the marine type, such as is shown and described in my pending application, Serial No. 68,719, filed November 12, 1925 now Patent Number 1,744,331, January 21, 1930. Referring particularly to this figure the numeral 1 designates a valve casing, having an inlet opening 22 and an outlet opening 23, the valve body adjacent to the openings, being flanged for attachment to the boiler and to the pipe leading to the point of work, as usual.

The numeral 24 designates a stop valve, which seats upon a seat 25 on seat ring 26, threaded into the valve body. The stop valve is provided with a cylindrical extention 27, provided circumferentially for a considerable portion of its length with numerous perforations or nozzles 28. Secured to the extension 27, and within the same, the separator is secured. In attaching the separator to a valve, I preferably provide the cylinder 27 with a bracket 29, and a central boss 30, through which the drain pipe 21 is guided in the opening and closing movement of the valve.

In any application of the separator it will be understood that the drain pipe 21 returns to the source of the liquid laden fluid, from which source, as before intimated, the fluid passes through the separator under pressure.

The numeral 31 designates the valve stem, through which, it will be understood, the valve is opened and closed.

In operation the fluid to be separated passes into the inlet 4, through the open bottom of the cylinder 9, and through the slots between the vanes or slats of the cage and forcefully impinges according to the pressure under which it enters the inlet opening against the inner periphery of the cylinder against which the water, in the case of steam, is separated from the steam, and the condensate forms on the inner periphery of the cylinder, while the steam virtually or substantially denuded of its moisture, passes through the perforations or nozzles to the point of work. The moisture accumulating on the inner surface of the cylinder falls down upon the flange 13 and flows to the sumps 17, from which it passes through the pipes 18, to the drain pipe 21, and thence back to its source.

By placing the inlet and outlet openings in angular relationship, the direction of the flow of the steam is abruptly interrupted which greatly facilitates the separation of the water from the steam. In the present arrangement wherein the inlet 4 is vertical and the outlet 5 horizontal, which arrangement under some conditions may be reversed, the steam passing between the vanes of the cage or turbine 9 is carried in a horizontal direction against the perforated wall of the sleeve or cylinder 6 and said sleeve being surrounded by steam will balance the particles of water separated from the steam and permit them to drop by gravity within the space between the cage and sleeve and reach the sump, the particles of water at this time being balanced, thus avoiding the possibility of being carried on again by the steam flow, which would happen if the outlet was in line with the inlet.

Claims:

1. In a separator of the character described, the combination of a hollow body having an inlet opening and an outlet opening, a second body within the first mentioned one and interposed between said inlet and outlet openings, said second body provided with numerous small perforations, a cage within the perforated member and provided with a flange of greater diameter than the cage, whereby said cage is spaced from the inner periphery of the inner body, to form an annular channel between the inner body and lower portion of the cage to entrap the condensates of the fluid passing through the body, and means communicating with said channel whereby the entrapped condensates are disposed of.

2. In a separator of the character described, in combination, a hollow body having an inlet opening and an outlet opening, a second hollow cylindrical body within the first mentioned body and provided with numerous small perforations or nozzles, a cage within the second body and provided at one end with a flange of greater diameter than the cage, whereby said cage is spaced from the inner periphery of the inner wall of the second body, said flange together with the cage and inner wall of the second body forming an annular channel between the cage and said body to trap the condensates, said channel being provided with sumps, a bleeder pipe entering said sumps wherethrough the condensates entering the sumps are disposed of.

3. A separator as claimed in claim 2, characterized in that the sumps are oppositely disposed in the cage flange, and that the bleeder pipe opens into each of said sumps, and that the openings in said pipe lead to a common outlet.

4. In a separator of the character described, the combination of a hollow body having an inlet opening and an outlet opening, a second body within the first mentioned one and interposed between the inlet and outlet openings, said second body being provided with numerous small perforations, a cage within the perforated member and provided with numerous vertically arranged openings, said cage being provided with a flange of greater diameter than the cage, whereby said cage is spaced from the inner periphery of the inner body to form an annular channel between the inner body and lower portion of the cage, to entrap the condensates of the fluid passing through the body, and means communicating with said channel whereby the entrapped condensates are disposed of.

5. In a separator of the character described, the combination of a hollow body having angularly disposed openings therein, one constituting an inlet opening and the other an outlet opening, a second body within the first mentioned one and interposed between the inlet and outlet openings, said second body being provided with numerous small perforations, a cage within the perforated member and provided with a flange of greater diameter than the cage whereby said cage is spaced from the inner periphery of the inner body, to form an annular channel between the inner body and lower portion of the cage, to entrap the condensates of the fluid passing through said body.

In testimony whereof he affixes his signature.

PASQUALE PASCALE.